(12) United States Patent
Lamb et al.

(10) Patent No.: US 12,059,039 B2
(45) Date of Patent: Aug. 13, 2024

(54) MEMS-BASED SENSOR FOR AN AEROSOL DELIVERY DEVICE

(71) Applicant: RAI Strategic Holdings, Inc., Winston-Salem, NC (US)

(72) Inventors: Wilson Christopher Lamb, Hillsborough, NC (US); Frederic Philippe Ampolini, Sr., Winston-Salem, NC (US); Raymond Charles Henry, Jr., Green Cove Springs, FL (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 564 days.

(21) Appl. No.: 17/336,784

(22) Filed: Jun. 2, 2021

(65) Prior Publication Data
US 2021/0282464 A1    Sep. 16, 2021

Related U.S. Application Data

(62) Division of application No. 14/539,215, filed on Nov. 12, 2014, now Pat. No. 11,051,554.

(51) Int. Cl.
*A24F 40/51* (2020.01)
*A24F 40/10* (2020.01)
(Continued)

(52) U.S. Cl.
CPC ............ *A24F 40/51* (2020.01); *G01L 9/0072* (2013.01); *A24F 40/10* (2020.01); *A24F 40/42* (2020.01); *A24F 40/485* (2020.01)

(58) Field of Classification Search
CPC ....... G01L 9/12; G01L 9/0052; G01L 9/0072; A24F 40/485; A24F 40/42; A24F 40/10; A24F 40/51
See application file for complete search history.

(56) References Cited

U.S. PATENT DOCUMENTS

| 1,771,366 A | 7/1930 | Wyss et al. |
| 2,057,353 A | 10/1936 | Whittemore, Jr. |

(Continued)

FOREIGN PATENT DOCUMENTS

| AU | 276250 | 7/1965 |
| CA | 2 641 869 | 5/2010 |

(Continued)

OTHER PUBLICATIONS

Notice of Opposition from the corresponding European Patent Application No. 18188661.5, dated Feb. 4, 2022, 26 pages.

(Continued)

*Primary Examiner* — Jean F Duverne
(74) *Attorney, Agent, or Firm* — Womble Bond Dickinson (US) LLP

(57) ABSTRACT

An aerosol delivery device is provided that includes a housing, microelectromechanical systems-based (MEMS-based) sensor and microprocessor. The MEMS-based sensor is within the housing and configured to detect a pressure on the MEMS-based sensor caused by airflow through at least a portion of the housing. The MEMS-based sensor is configured to convert the pressure to an electrical signal, and output the electrical signal. The microprocessor is configured to receive the electrical signal from the MEMS-based sensor, and control operation of at least one functional element of the aerosol delivery device based thereon.

9 Claims, 3 Drawing Sheets

Figure 1:
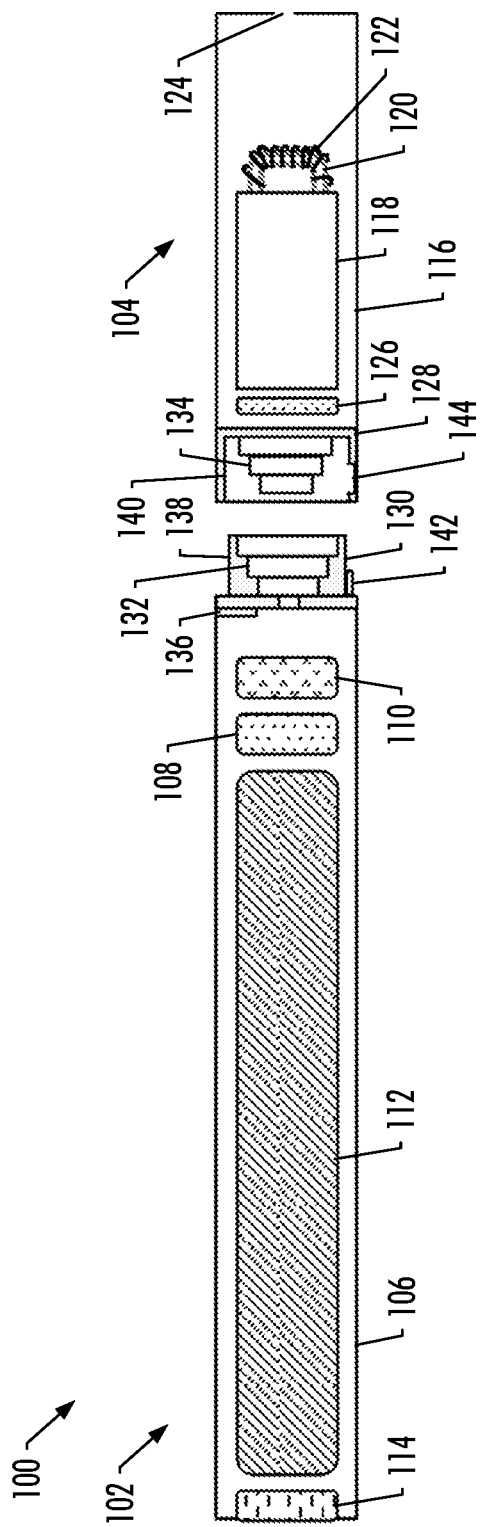

(51) Int. Cl.
    *A24F 40/42*    (2020.01)
    *A24F 40/485*   (2020.01)
    *G01L 9/00*     (2006.01)

(56) References Cited

U.S. PATENT DOCUMENTS

| | | |
|---|---|---|
| 2,104,266 A | 1/1938 | McCormick |
| 3,200,819 A | 8/1965 | Gilbert |
| 4,284,089 A | 8/1981 | Ray |
| 4,303,083 A | 12/1981 | Burruss, Jr. |
| 4,735,217 A | 4/1988 | Gerth et al. |
| 4,848,374 A | 7/1989 | Chard et al. |
| 4,907,606 A | 3/1990 | Lilja et al. |
| 4,922,901 A | 5/1990 | Brooks et al. |
| 4,945,931 A | 8/1990 | Gori |
| 4,947,874 A | 8/1990 | Brooks et al. |
| 4,947,875 A | 8/1990 | Brooks et al. |
| 4,986,286 A | 1/1991 | Roberts et al. |
| 5,019,122 A | 5/1991 | Clearman et al. |
| 5,042,510 A | 8/1991 | Curtiss et al. |
| 5,060,671 A | 10/1991 | Counts et al. |
| 5,093,894 A | 3/1992 | Deevi et al. |
| 5,144,962 A | 8/1992 | Counts et al. |
| 5,249,586 A | 10/1993 | Morgan et al. |
| 5,261,424 A | 11/1993 | Sprinkel, Jr. |
| 5,322,075 A | 6/1994 | Deevi et al. |
| 5,353,813 A | 10/1994 | Deevi et al. |
| 5,369,723 A | 11/1994 | Counts et al. |
| 5,372,148 A | 12/1994 | McCafferty et al. |
| 5,388,574 A | 2/1995 | Ingebrethsen et al. |
| 5,408,574 A | 4/1995 | Deevi et al. |
| 5,468,936 A | 11/1995 | Deevi et al. |
| 5,498,850 A | 3/1996 | Das |
| 5,515,842 A | 5/1996 | Ramseyer et al. |
| 5,530,225 A | 6/1996 | Hajaligol |
| 5,564,442 A | 10/1996 | MacDonald et al. |
| 5,649,554 A | 7/1997 | Sprinkel et al. |
| 5,666,977 A | 9/1997 | Higgins et al. |
| 5,687,746 A | 11/1997 | Rose et al. |
| 5,726,421 A | 3/1998 | Fleischhauer et al. |
| 5,727,571 A | 3/1998 | Meiring et al. |
| 5,799,663 A | 9/1998 | Gross et al. |
| 5,819,756 A | 10/1998 | Mielordt |
| 5,865,185 A | 2/1999 | Collins et al. |
| 5,865,186 A | 2/1999 | Volsey, II |
| 5,878,752 A * | 3/1999 | Adams ............... A24F 40/465 |
| | | 131/194 |
| 5,894,841 A | 4/1999 | Voges |
| 5,934,289 A | 8/1999 | Watkins et al. |
| 5,954,979 A | 9/1999 | Counts et al. |
| 5,967,148 A | 10/1999 | Harris et al. |
| 6,040,560 A | 3/2000 | Fleischhauer et al. |
| 6,053,176 A | 4/2000 | Adams et al. |
| 6,089,857 A | 7/2000 | Matsuura et al. |
| 6,095,153 A | 8/2000 | Kessler et al. |
| 6,125,853 A | 10/2000 | Susa et al. |
| 6,155,268 A | 12/2000 | Takeuchi |
| 6,164,287 A | 12/2000 | White |
| 6,196,218 B1 | 3/2001 | Voges |
| 6,196,219 B1 | 3/2001 | Hess et al. |
| 6,601,776 B1 | 8/2003 | Oljaca et al. |
| 6,615,840 B1 | 9/2003 | Fournier et al. |
| 6,688,313 B2 | 2/2004 | Wrenn et al. |
| 6,772,756 B2 | 8/2004 | Shayan |
| 6,803,545 B2 | 10/2004 | Blake et al. |
| 6,854,461 B2 | 2/2005 | Nichols |
| 6,854,470 B1 | 2/2005 | Pu |
| 7,111,518 B1 | 9/2006 | Allen et al. |
| 7,117,867 B2 | 10/2006 | Cox et al. |
| 7,293,565 B2 | 11/2007 | Griffin et al. |
| 7,513,253 B2 | 4/2009 | Kobayashi et al. |
| 7,775,459 B2 | 8/2010 | Martens, III et al. |
| 7,832,410 B2 | 11/2010 | Hon |
| 7,845,359 B2 | 12/2010 | Montaser |
| 7,896,006 B2 | 3/2011 | Hamano et al. |
| 7,987,726 B2 | 8/2011 | Dannhauer |
| 8,127,772 B2 | 3/2012 | Montaser |
| 8,314,591 B2 | 11/2012 | Terry et al. |
| 8,365,742 B2 | 2/2013 | Hon |
| 8,402,976 B2 | 3/2013 | Fernando et al. |
| 8,499,766 B1 | 8/2013 | Newton |
| 8,528,569 B1 | 9/2013 | Newton |
| 8,550,069 B2 | 10/2013 | Alelov |
| 8,774,428 B2 | 7/2014 | Jaar et al. |
| 2002/0146242 A1 | 10/2002 | Vieira |
| 2003/0226837 A1 | 12/2003 | Blake et al. |
| 2004/0118401 A1 | 6/2004 | Smith et al. |
| 2004/0129280 A1 | 7/2004 | Woodson et al. |
| 2004/0200488 A1 | 10/2004 | Felter et al. |
| 2004/0223917 A1 | 11/2004 | Hindle et al. |
| 2004/0226568 A1 | 11/2004 | Takeuchi et al. |
| 2005/0016550 A1 | 1/2005 | Katase |
| 2005/0183725 A1 | 8/2005 | Gumaste et al. |
| 2006/0016453 A1 | 1/2006 | Kim |
| 2006/0196518 A1 | 9/2006 | Hon |
| 2007/0044793 A1 | 3/2007 | Kleinstreuer et al. |
| 2007/0074734 A1 | 4/2007 | Braunshteyn et al. |
| 2007/0102013 A1 | 5/2007 | Adams et al. |
| 2007/0215167 A1 | 9/2007 | Crooks et al. |
| 2008/0085103 A1 | 4/2008 | Beland et al. |
| 2008/0092912 A1 | 4/2008 | Robinson et al. |
| 2008/0257367 A1 | 10/2008 | Paterno et al. |
| 2008/0276947 A1 | 11/2008 | Martzel |
| 2008/0302374 A1 | 12/2008 | Wengert et al. |
| 2009/0095311 A1 | 4/2009 | Hon |
| 2009/0095312 A1 | 4/2009 | Herbrich et al. |
| 2009/0126745 A1 | 5/2009 | Hon |
| 2009/0188490 A1 | 7/2009 | Hon |
| 2009/0202089 A1 | 8/2009 | Zhang et al. |
| 2009/0230117 A1 | 9/2009 | Fernando et al. |
| 2009/0272379 A1 | 11/2009 | Thorens et al. |
| 2009/0283103 A1 | 11/2009 | Nielsen et al. |
| 2009/0320863 A1 | 12/2009 | Fernando et al. |
| 2010/0043809 A1 | 2/2010 | Magnon |
| 2010/0083959 A1 | 4/2010 | Siller |
| 2010/0163063 A1 | 7/2010 | Fernando et al. |
| 2010/0200006 A1 | 8/2010 | Robinson et al. |
| 2010/0229881 A1 | 9/2010 | Hearn |
| 2010/0242974 A1 | 9/2010 | Pan |
| 2010/0307518 A1 | 12/2010 | Wang |
| 2010/0313901 A1 | 12/2010 | Fernando et al. |
| 2011/0005535 A1 | 1/2011 | Xiu |
| 2011/0011396 A1 | 1/2011 | Fang |
| 2011/0036363 A1 | 2/2011 | Urtsev et al. |
| 2011/0036365 A1 | 2/2011 | Chong et al. |
| 2011/0094523 A1 | 4/2011 | Thorens et al. |
| 2011/0126848 A1 | 6/2011 | Zuber et al. |
| 2011/0155153 A1 | 6/2011 | Thorens et al. |
| 2011/0155718 A1 | 6/2011 | Greim et al. |
| 2011/0168194 A1 | 7/2011 | Hon |
| 2011/0265806 A1 | 11/2011 | Alarcon et al. |
| 2011/0309157 A1 | 12/2011 | Yang et al. |
| 2011/0311080 A1* | 12/2011 | Jaar ........................ H04R 3/00 |
| | | 381/174 |
| 2012/0042885 A1 | 2/2012 | Stone et al. |
| 2012/0060853 A1 | 3/2012 | Robinson et al. |
| 2012/0111347 A1 | 5/2012 | Hon |
| 2012/0132643 A1 | 5/2012 | Choi et al. |
| 2012/0175747 A1 | 7/2012 | Schlarmann et al. |
| 2012/0186594 A1 | 7/2012 | Liu |
| 2012/0227752 A1 | 9/2012 | Alelov |
| 2012/0231464 A1 | 9/2012 | Yu et al. |
| 2012/0260927 A1 | 10/2012 | Liu |
| 2012/0266684 A1 | 10/2012 | Hooper et al. |
| 2012/0279512 A1 | 11/2012 | Hon |
| 2012/0318882 A1 | 12/2012 | Abehasera |
| 2013/0037041 A1 | 2/2013 | Worm et al. |
| 2013/0056013 A1 | 3/2013 | Terry et al. |
| 2013/0081625 A1 | 4/2013 | Rustad et al. |
| 2013/0081642 A1 | 4/2013 | Safari |
| 2013/0192619 A1 | 8/2013 | Tucker et al. |
| 2013/0298905 A1* | 11/2013 | Levin ..................... A24F 40/90 |
| | | 128/202.21 |
| 2013/0306084 A1 | 11/2013 | Flick |

(56) References Cited

U.S. PATENT DOCUMENTS

| | | |
|---|---|---|
| 2013/0319439 A1 | 12/2013 | Gorelick et al. |
| 2013/0340750 A1 | 12/2013 | Thorens et al. |
| 2013/0340775 A1 | 12/2013 | Juster et al. |
| 2014/0060554 A1 | 3/2014 | Collett et al. |
| 2014/0060555 A1 | 3/2014 | Chang et al. |
| 2014/0096781 A1 | 4/2014 | Sears et al. |
| 2014/0096782 A1 | 4/2014 | Ampolini et al. |
| 2015/0245660 A1 | 9/2015 | Lord |
| 2016/0007653 A1 | 1/2016 | Tu |
| 2016/0128389 A1 | 5/2016 | Lamb et al. |

FOREIGN PATENT DOCUMENTS

| | | |
|---|---|---|
| CN | 1347495 | 5/2002 |
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 101517388 | 8/2009 |
| CN | 201379072 | 1/2010 |
| CN | 102770743 | 11/2012 |
| CN | 103512701 | 1/2014 |
| CN | 103997921 | 8/2014 |
| DE | 10 2006 004 484 | 8/2007 |
| DE | 102006041042 | 3/2008 |
| DE | 20 2009 010 400 | 11/2009 |
| EP | 0 295 122 | 12/1988 |
| EP | 0 430 566 | 6/1991 |
| EP | 0 845 220 | 6/1998 |
| EP | 1 618 803 | 1/2006 |
| EP | 2 100 525 | 9/2009 |
| EP | 2 143 346 | 1/2010 |
| EP | 2 316 286 | 5/2011 |
| EP | 2 770 860 | 4/2016 |
| EP | 3185938 | 7/2017 |
| GB | 2469850 | 11/2010 |
| GB | 2507104 | 4/2014 |
| JP | 2005-274175 | 10/2005 |
| JP | 2007-523700 | 8/2007 |
| JP | 2012-225925 | 11/2012 |
| JP | 2013-154465 | 8/2013 |
| JP | 2014-206514 | 10/2014 |
| WO | WO 1997/48293 | 12/1997 |
| WO | WO 98/29711 | 7/1998 |
| WO | WO 2004/043175 | 5/2004 |
| WO | WO 2004/080216 | 9/2004 |
| WO | WO 2005/099494 | 10/2005 |
| WO | WO 2007/078273 | 7/2007 |
| WO | WO 2007/131449 | 11/2007 |
| WO | WO 2009/105919 | 9/2009 |
| WO | WO 2009/127401 | 10/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/118644 | 10/2010 |
| WO | WO 2010/140937 | 12/2010 |
| WO | WO 2011/010334 | 1/2011 |
| WO | WO 2011/033396 | 3/2011 |
| WO | WO 2011/063970 | 6/2011 |
| WO | WO 2012/072762 | 6/2012 |
| WO | WO 2012/072790 | 6/2012 |
| WO | WO 2012/100523 | 8/2012 |
| WO | WO 2013/060781 | 5/2013 |
| WO | WO 2013/060784 | 5/2013 |
| WO | WO 2013/089551 | 6/2013 |
| WO | WO 2014/054035 | 4/2014 |
| WO | WO 2014/060268 | 4/2014 |
| WO | WO 2014/066730 | 5/2014 |
| WO | WO 2014/110119 | 7/2014 |
| WO | WO 2016/030521 | 3/2016 |

OTHER PUBLICATIONS

Bao, M., "Analysis and Design Principles of MEMS Devices," Elsevier, 2005.

Scheeper, P.R. et al., "A review of silicon microphones," Sensors and Actuators, 1994, pp. 1-11.

Voorthuyzen, J.A. et al., "Optimization of Capacitive Microphone and Pressure Sensor Performance by Capacitor-electrode Shaping," Sensors and Actuators, 1991, pp. 331-335.

Jerad Lewis; Analog Devices—Technical Article MS-2472; Analog and Digital MEMS Microphone Design Considerations; © 2013 Analog Devices, Inc.; 4 pages; www.analog.com.

John Widder and Alessandro Morcelli; Basic Principles of MEMS Microphones; EDN Network; May 14, 2014; 9 pages.

AN4426 Application Note—Tutorial for MEMs Microphones; Jan. 2014; C2014 STMicroelectronics; 18 pages; www.st.com.

MEMS Microphone—A Breakthrough Innovation in Sound Sensing; EE Herald; 3 pages; website visited Oct. 23, 2014 http://www.eeherald.com/section/design-guide/mems-microphone.html.

Jerad Lewis and Brian Moss; MEMS Microphone: The Future for Hearing Aids; Dec. 31, 2013; InvenSense Inc.; 6 pages; www.invensense.com.

Chang Liu; Chapter 6: Piezoresistive Sensors; Foundations of MEMS, $2^{nd}$ Edition; © 2012 PH Professional Business; published Mar. 4, 201; pp. 207-244.

International Search Report and Written Opinion dated Jan. 27, 2016 for Application No. PCT/US2015/060099.

Buffer amplifier, https://en.wikipedia.org/w/index.php?title=Buffer_amplifier&oldid=880070693 (last visited Jan. 25, 2019 (Year: 2019).

"Microelectromechanical Systems," Wikipedia, https://en.wikipedia.org/w/index.php?title=Microelectromechanical_systems&oldid=63085965 3, May 9, 2019, 11 pages.

Guo, George, "Pressure Altimetry Using the MPL31152A2," Freescale Semiconductor, Inv., Application Note, Document No. AN4528, Rev. 0, 2012, pp. 1-13.

Beeby et al., "MEMS Mechanical Sensors," Artech House, Inc., 2004, pp. 22-23, 28-29, 70-81, 85, 92-93, 112-113, 120-121, 130-145.

"Microphone," Wikipedia, https://en.wikipedia.org/w/index.php?title=Microphone&oldid=633335330, May 13, 2019, 20 pages.

Shahiri-Tabarestani et al., "Design and Simulation of High Sensitive Capacitive Pressure Sensor with Slotted Diaphragm," 2012 International Conference on Biomedical Engineering (ICoBE), Feb. 27-28, 2012, pp. 484-489.

Notice of Opposition from the corresponding European Patent Application No. 15797773.7, dated Jul. 18, 2019, 53 pages.

Notice of Opposition from the corresponding European Patent Application No. 15797773.7, dated Jul. 16, 2019, 27 pages.

Extended European Search Report from the corresponding European Patent Application No. 18188661.5, dated Nov. 23, 2018, 9 pages.

* cited by examiner

```
                                    ┌─ 500
                                    ↓
        ┌──────────────────────────────┐
        │ DETECT PRESSURE ON MEMS-BASED │
502 ─── │ SENSOR AND OUTPUT ELECTRICAL  │
        │            SIGNAL             │
        └──────────────────────────────┘
                       ↓
        ┌──────────────────────────────┐
        │ CONTROL OPERATION OF AEROSOL  │
504 ─── │    DELIVERY DEVICE BASED ON   │
        │       ELECTRICAL SIGNAL       │
        └──────────────────────────────┘
                       ↓
```

FIG. 5

MEMS-BASED SENSOR FOR AN AEROSOL DELIVERY DEVICE

CROSS-REFERENCE TO RELATED APPLICATION(S)

The present application is a divisional of U.S. patent application Ser. No. 14/539,215, entitled: MEMS-Based Sensor for an Aerosol Delivery Device, filed Nov. 12, 2014, the content of which is hereby incorporated by reference.

TECHNOLOGICAL FIELD

The present disclosure relates to aerosol delivery devices such as smoking articles, and more particularly to aerosol delivery devices that may utilize electrically generated heat for the production of aerosol (e.g., smoking articles commonly referred to as electronic cigarettes). The smoking articles may be configured to heat an aerosol precursor, which may incorporate materials that may be made or derived from, or otherwise incorporate tobacco, the precursor being capable of forming an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar or pipe smoking, but without delivering considerable quantities of incomplete combustion and pyrolysis products that result from the burning of tobacco. To this end, there have been proposed numerous smoking products, flavor generators and medicinal inhalers that utilize electrical energy to vaporize or heat a volatile material, or attempt to provide the sensations of cigarette, cigar or pipe smoking without burning tobacco to a significant degree. See, for example, the various alternative smoking articles, aerosol delivery devices and heat generating sources set forth in the background art described in U.S. Pat. No. 7,726,320 to Robinson et al., U.S. Pat. App. Pub. No. 2013/0255702 to Griffith Jr. et al., and U.S. Pat. App. Pub. No. 2014/0096781 to Sears et al., all of which are incorporated herein by reference in their entireties. See also, for example, the various types of smoking articles, aerosol delivery devices and electrically-powered heat generating sources referenced by brand name and commercial source in U.S. patent application Ser. No. 14/170,838 to Bless et al., filed Feb. 3, 2014, which is incorporated herein by reference in its entirety.

It would be desirable to provide a smoking article that employs heat produced by electrical energy to provide the sensations of cigarette, cigar, or pipe smoking, that does so without combusting or pyrolyzing tobacco to any significant degree, that does so without the need of a combustion heat source, and that does so without necessarily delivering considerable quantities of incomplete combustion and pyrolysis products. Further, advances with respect to manufacturing electronic smoking articles would be desirable.

BRIEF SUMMARY

The present disclosure relates to aerosol delivery devices, methods of forming such devices, and elements of such devices. According to one aspect of example implementations of the present disclosure, an aerosol delivery device is provided. The aerosol delivery device includes a housing, microelectromechanical systems-based (MEMS-based) sensor and microprocessor. The MEMS-based sensor is within the housing and configured to detect a pressure on the MEMS-based sensor caused by airflow through at least a portion of the housing. The MEMS-based sensor is configured to convert the pressure to an electrical signal, and output the electrical signal.

The microprocessor is configured to receive the electrical signal from the MEMS-based sensor, and control operation of at least one functional element of the aerosol delivery device based thereon. This may include, for example, the microprocessor being configured to control the operation of a heater, fluid-delivery member, sensory-feedback member or any combination thereof.

In some examples, the MEMS-based sensor may be configured to convert the pressure to the electrical signal that varies with a corresponding variation in the pressure relative to an ambient pressure on the MEMS-based sensor. In these examples, the corresponding variation may be caused by variation in the airflow such as a variation in the rate of airflow.

In some examples, the MEMS-based sensor may be a MEMS microphone including a die with a micromachined, pressure-sensitive diaphragm and a backplate that form a variable capacitor. In these examples, in an instance in which an input voltage is applied to the variable capacitor, the pressure causes movement of the diaphragm and thereby a change in a capacitance of the variable capacitor. The change in capacitance causes a change in an output voltage across the variable capacitor. And the MEMS microphone is configured to output the output voltage or a digital representation thereof as the electrical signal.

In some examples, the MEMS-based sensor may be a MEMS pressure sensor including a die with a micromachined, pressure-sensitive diaphragm, and one or more piezoresistors disposed on the diaphragm. In these examples, in an instance in which an input voltage is applied to the piezoresistor(s), the pressure causes movement of the diaphragm and thereby a change in a resistance of the piezoresistor(s). The change in resistance causes a change in an output voltage across the piezoresistor(s). And the MEMS pressure sensor is configured to output the output voltage or a digital representation thereof as the electrical signal.

In some further examples, the MEMS microphone or MEMS pressure sensor further comprises another die wire bonded to the die and including a bias generator circuit configured to bias the variable capacitor or piezoresistor(s) with the input voltage. In another aspect of example implementations, a method is provided for controlling operation of an aerosol delivery device including a MEMS-based sensor within a housing of the aerosol delivery device. The features, functions and advantages discussed herein may be achieved independently in various example implementations or may be combined in yet other example implementations further details of which may be seen with reference to the following description and drawings.

BRIEF DESCRIPTION OF THE DRAWING(S)

Figure 2:
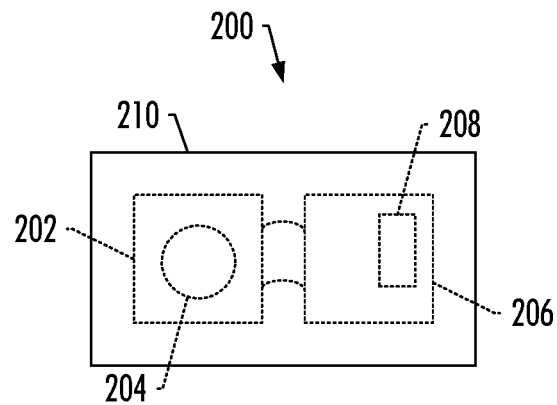
Figure 3:
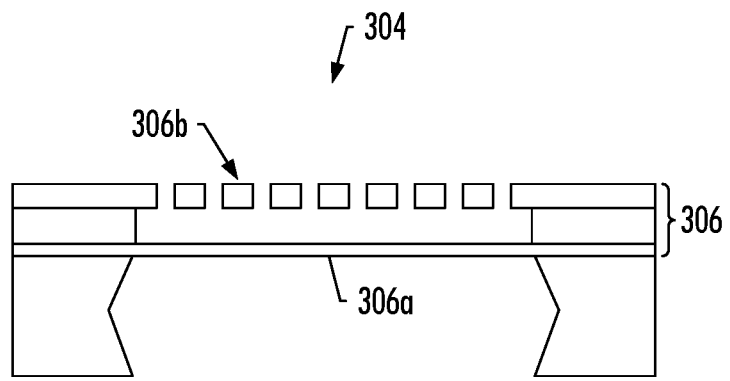
Figure 4:
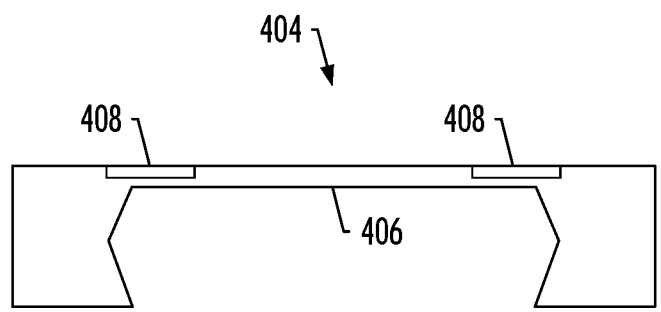

Having thus described the disclosure in the foregoing general terms, reference will now be made to the accompanying drawings, which are not necessarily drawn to scale, and wherein:

FIG. 1 is a partially cut-away view of an aerosol delivery device comprising a cartridge and a control body including a variety of elements that may be utilized in an aerosol delivery device according to various example implementations of the present disclosure;

FIG. 2 schematically illustrates a MEMS-based sensor for use in an aerosol delivery device according to example implementations;

FIGS. 3 and 4 schematically illustrate micromachined sensors for a MEMS-based sensor in the form of a MEMS microphone and MEMS pressure sensor, respectively, in accordance with some example implementations; and FIG. 5 illustrates various operations in a method of controlling operation of an aerosol delivery device including a MEMS-based sensor within a housing thereof, according to example implementations.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise.

As described hereinafter, example implementations of the present disclosure relate to aerosol delivery systems. Aerosol delivery systems according to the present disclosure use electrical energy to heat a material (preferably without combusting the material to any significant degree) to form an inhalable substance; and components of such systems have the form of articles most preferably are sufficiently compact to be considered hand-held devices. That is, use of components of preferred aerosol delivery systems does not result in the production of smoke in the sense that aerosol results principally from by-products of combustion or pyrolysis of tobacco, but rather, use of those preferred systems results in the production of vapors resulting from volatilization or vaporization of certain components incorporated therein. In some example implementations, components of aerosol delivery systems may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery systems may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

Aerosol delivery systems of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

Aerosol delivery systems of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing or the elongated housing can be formed of two or more separable bodies. For example, an aerosol delivery device can comprise an elongated shell or body that can be substantially tubular in shape and, as such, resemble the shape of a conventional cigarette or cigar. In one example, all of the components of the aerosol delivery device are contained within one housing. Alternatively, an aerosol delivery device can comprise two or more housings that are joined and are separable. For example, an aerosol delivery device can possess at one end a control body comprising a housing containing one or more reusable components (e.g., a rechargeable battery and various electronics for controlling the operation of that article), and at the other end and removably attached thereto an outer body or shell containing a disposable portion (e.g., a disposable flavor-containing cartridge).

Aerosol delivery systems of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microprocessor, individually or as part of a microcontroller), a heater or heat generation member (e.g., an electrical resistance heating element or other component, which alone or in combination with one or more further elements may be commonly referred to as an "atomizer"), an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined airflow path through the article such that aerosol generated can be withdrawn therefrom upon draw).

More specific formats, configurations and arrangements of components within the aerosol delivery systems of the present disclosure will be evident in light of the further disclosure provided hereinafter. Additionally, the selection and arrangement of various aerosol delivery system components can be appreciated upon consideration of the commercially available electronic aerosol delivery devices, such as those representative products referenced in background art section of the present disclosure.

In various examples, an aerosol delivery device can comprise a reservoir configured to retain the aerosol precursor composition. The reservoir particularly can be formed of a porous material (e.g., a fibrous material) and thus may be referred to as a porous substrate (e.g., a fibrous substrate).

A fibrous substrate useful as a reservoir in an aerosol delivery device can be a woven or nonwoven material formed of a plurality of fibers or filaments and can be formed of one or both of natural fibers and synthetic fibers. For example, a fibrous substrate may comprise a fiberglass material. In particular examples, a cellulose acetate material can be used. In other example implementations, a carbon material can be used. A reservoir may be substantially in the form of a container and may include a fibrous material included therein.

One example implementation of an aerosol delivery device 100 according to the present disclosure is provided in FIG. 1. As seen in the cut-away view illustrated therein, the aerosol delivery device can comprise a control body 102 and a cartridge 104 that can be permanently or detachably aligned in a functioning relationship. Engagement of the control body and the cartridge can be press fit (as illustrated), threaded, interference fit, magnetic or the like. In particular, connection components, such as further described herein may be used. For example, the control body may include a coupler that is adapted to engage a connector on the cartridge.

In specific example implementations, one or both of the control body 102 and the cartridge 104 may be referred to as being disposable or as being reusable. For example, the control body may have a replaceable battery or a rechargeable battery and thus may be combined with any type of recharging technology, including connection to a typical electrical outlet, connection to a car charger (i.e., cigarette lighter receptacle), and connection to a computer, such as through a universal serial bus (USB) cable. For example, an adaptor including a USB connector at one end and a control body connector at an opposing end is disclosed in U.S. Pat. App. Pub. No. 2014/0261495 to Novak et al., which is incorporated herein by reference in its entirety. Further, in some examples the cartridge may comprise a single-use cartridge, as disclosed in U.S. Pat. App. Pub. No. 2014/0060555 to Chang et al., which is incorporated herein by reference in its entirety.

As illustrated in FIG. 1, the control body 102 can be formed of a control body shell 106 that can include a control component 108 (e.g., a microprocessor, individually or as part of a microcontroller), a flow sensor 110, a battery 112 and a light-emitting diode (LED) 114, and such components can be variably aligned. Further indicators (e.g., a haptic feedback component, an audio feedback component, or the like) can be included in addition to or as an alternative to the LED. The cartridge 104 can be formed of a cartridge shell 116 enclosing a reservoir 118 that is in fluid communication with a liquid transport element 120 adapted to wick or otherwise transport an aerosol precursor composition stored in the reservoir housing to a heater 122 (sometimes referred to as a heating element). In some example, a valve may be positioned between the reservoir and heater, and configured to control an amount of aerosol precursor composition passed or delivered from the reservoir to the heater.

Various examples of materials configured to produce heat when electrical current is applied therethrough may be employed to form the heater 122. The heater in these examples may be resistive heating element such as a wire coil. Example materials from which the wire coil may be formed include Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials (e.g., carbon-based foams and yarns) and ceramics (e.g., positive or negative temperature coefficient ceramics). Example implementations of heaters or heating members useful in aerosol delivery devices according to the present disclosure are further described below, and can be incorporated into devices such as illustrated in FIG. 1 as described herein.

An opening 124 may be present in the cartridge shell 116 (e.g., at the mouthend) to allow for egress of formed aerosol from the cartridge 104. Such components are representative of the components that may be present in a cartridge and are not intended to limit the scope of cartridge components that are encompassed by the present disclosure.

The cartridge 104 also may include one or more electronic components 126, which may include an integrated circuit, a memory component, a sensor, or the like. The electronic components may be adapted to communicate with the control component 108 and/or with an external device by wired or wireless means. The electronic components may be positioned anywhere within the cartridge or a base 128 thereof.

Although the control component 108 and the flow sensor 110 are illustrated separately, it is understood that the control component and the flow sensor may be combined as an electronic circuit board with the air flow sensor attached directly thereto. Further, the electronic circuit board may be positioned horizontally relative the illustration of FIG. 1 in that the electronic circuit board can be lengthwise parallel to the central axis of the control body. In some examples, the air flow sensor may comprise its own circuit board or other base element to which it can be attached. In some examples, a flexible circuit board may be utilized. A flexible circuit board may be configured into a variety of shapes, include substantially tubular shapes. In some examples, a flexible circuit board may be combined with, layered onto, or form part or all of a heater substrate as further described below.

The control body 102 and the cartridge 104 may include components adapted to facilitate a fluid engagement therebetween. As illustrated in FIG. 1, the control body can include a coupler 130 having a cavity 132 therein. The base 128 of the cartridge can be adapted to engage the coupler and can include a projection 134 adapted to fit within the cavity. Such engagement can facilitate a stable connection between the control body and the cartridge as well as establish an electrical connection between the battery 112 and control component 108 in the control body and the heater 122 in the cartridge. Further, the control body shell 106 can include an air intake 136, which may be a notch in the shell where it connects to the coupler that allows for passage of ambient air around the coupler and into the shell where it then passes through the cavity 132 of the coupler and into the cartridge through the projection 134.

A coupler and a base useful according to the present disclosure are described in U.S. Pat. App. Pub. No. 2014/0261495 to Novak et al., which is incorporated herein by reference in its entirety. For example, the coupler 130 as seen in FIG. 1 may define an outer periphery 138 configured to mate with an inner periphery 140 of the base 128. In one example the inner periphery of the base may define a radius that is substantially equal to, or slightly greater than, a radius of the outer periphery of the coupler. Further, the coupler may define one or more protrusions 142 at the outer periphery configured to engage one or more recesses 144 defined at the inner periphery of the base. However, various other examples of structures, shapes and components may be employed to couple the base to the coupler. In some examples the connection between the base of the cartridge 104 and the coupler of the control body 102 may be substantially permanent, whereas in other examples the connection therebetween may be releasable such that, for example, the control body may be reused with one or more additional cartridges that may be disposable and/or refillable.

The aerosol delivery device 100 may be substantially rod-like or substantially tubular shaped or substantially cylindrically shaped in some examples. In other examples, further shapes and dimensions are encompassed—e.g., a rectangular or triangular cross-section, multifaceted shapes, or the like.

The reservoir 118 illustrated in FIG. 1 can be a container or can be a fibrous reservoir, as presently described. For example, the reservoir can comprise one or more layers of nonwoven fibers substantially formed into the shape of a tube encircling the interior of the cartridge shell 116, in this example. An aerosol precursor composition can be retained in the reservoir. Liquid components, for example, can be sorptively retained by the reservoir. The reservoir can be in fluid connection with the liquid transport element 120. The liquid transport element can transport the aerosol precursor composition stored in the reservoir via capillary action to the heater 122 that is in the form of a metal wire coil in this example. As such, the heater is in a heating arrangement with the liquid transport element. Example implementations of reservoirs and transport elements useful in aerosol delivery devices according to the present disclosure are further described below, and such reservoirs and/or transport elements can be incorporated into devices such as illustrated in FIG. 1 as described herein. In particular, specific combinations of heating members and transport elements as further described below may be incorporated into devices such as illustrated in FIG. 1 as described herein.

In use, when a user draws on the aerosol delivery device 100, airflow is detected by the flow sensor 110, and the heater 122 is activated to vaporize the components for the aerosol precursor composition. Drawing upon the mouthend of the aerosol delivery device causes ambient air to enter the air intake 136 and pass through the cavity 132 in the coupler 130 and the central opening in the projection 134 of the base 128. In the cartridge 104, the drawn air combines with the formed vapor to form an aerosol. The aerosol is whisked, aspirated or otherwise drawn away from the heater and out the opening 124 in the mouthend of the aerosol delivery device.

The various components of an aerosol delivery device according to the present disclosure can be chosen from components described in the art and commercially available. Examples of batteries that can be used according to the disclosure are described in U.S. Pat. App. Pub. No. 2010/0028766 to Peckerar et al., which is incorporated herein by reference in its entirety.

The aerosol delivery device 100 can incorporate the sensor 110 or another sensor or detector for control of supply of electric power to the heater 122 when aerosol generation is desired (e.g., upon draw during use). As such, for example, there is provided a manner or method for turning off the power supply to the heater when the aerosol delivery device is not be drawn upon during use, and for turning on the power supply to actuate or trigger the generation of heat by the heater during draw. Additional representative types of sensing or detection mechanisms, structure and configuration thereof, components thereof, and general methods of operation thereof, are described in U.S. Pat. No. 5,261,424 to Sprinkel, Jr., U.S. Pat. No. 5,372,148 to McCafferty et al., and PCT Pat. App. Pub. No. WO 2010/003480 to Flick, all of which are incorporated herein by reference in their entireties.

The aerosol delivery device 100 most preferably incorporates the control component 108 or another control mechanism for controlling the amount of electric power to the heater 122 during draw. Representative types of electronic components, structure and configuration thereof, features thereof, and general methods of operation thereof, are described in U.S. Pat. No. 4,735,217 to Gerth et al., U.S. Pat. No. 4,947,874 to Brooks et al., U.S. Pat. No. 5,372,148 to McCafferty et al., U.S. Pat. No. 6,040,560 to Fleischhauer et al., U.S. Pat. No. 7,040,314 to Nguyen et al., U.S. Pat. No. 8,205,622 to Pan, U.S. Pat. App. Pub. No. 2009/0230117 to Fernando et al., U.S. Pat. App. Pub. No. 2014/0060554 to Collet et al., U.S. Pat. App. Pub. No. 2014/0270727 to Ampolini et al., and U.S. patent application Ser. No. 14/209, 191 to Henry et al., filed Mar. 13, 2014, all of which are incorporated herein by reference in their entireties.

Representative types of substrates, reservoirs or other components for supporting the aerosol precursor are described in U.S. Pat. No. 8,528,569 to Newton, U.S. Pat. App. Pub. No. 2014/0261487 to Chapman et al., U.S. patent application Ser. No. 14/011,992 to Davis et al., filed Aug. 28, 2013, and U.S. patent application Ser. No. 14/170,838 to Bless et al., filed Feb. 3, 2014, all of which are incorporated herein by reference in their entireties. Additionally, various wicking materials, and the configuration and operation of those wicking materials within certain types of electronic cigarettes, are set forth in U.S. Pat. App. Pub. No. 2014/0209105 to Sears et al., which is incorporated herein by reference in its entirety.

The aerosol precursor composition, also referred to as a vapor precursor composition, may comprise a variety of components including, by way of example, a polyhydric alcohol (e.g., glycerin, propylene glycol or a mixture thereof), nicotine, tobacco, tobacco extract and/or flavorants. Various components that may be included in the aerosol precursor composition are described in U.S. Pat. No. 7,726,320 to Robinson et al., which is incorporated herein by reference in its entirety. Additional representative types of aerosol precursor compositions are set forth in U.S. Pat. No. 4,793,365 to Sensabaugh, Jr. et al., U.S. Pat. No. 5,101,839 to Jakob et al., U.S. Pat. No. 6,779,531 to Biggs et al., U.S. Pat. App. Pub. No. 2013/0008457 to Zheng et al., and Chemical and Biological Studies on New Cigarette Prototypes that Heat Instead of Burn Tobacco, R. J. Reynolds Tobacco Company Monograph (1988), all of which are incorporated herein by reference in their entireties.

Additional representative types of components that yield visual cues or indicators may be employed in the aerosol delivery device 100, such as LEDs and related components, vibratory elements and the like. Examples of suitable LED components, and the configurations and uses thereof, are described in U.S. Pat. No. 5,154,192 to Sprinkel et al., U.S. Pat. No. 8,499,766 to Newton, U.S. Pat. No. 8,539,959 to Scatterday, and U.S. patent application Ser. No. 14/173,266 to Sears et al., filed Feb. 5, 2014, all of which are incorporated herein by reference in their entireties.

Yet other features, controls or components that can be incorporated into aerosol delivery devices of the present disclosure are described in U.S. Pat. No. 5,967,148 to Harris et al., U.S. Pat. No. 5,934,289 to Watkins et al., U.S. Pat. No. 5,954,979 to Counts et al., U.S. Pat. No. 6,040,560 to Fleischhauer et al., U.S. Pat. No. 8,365,742 to Hon, U.S. Pat. No. 8,402,976 to Fernando et al., U.S. Pat. App. Pub. No. 2010/0163063 to Fernando et al., U.S. Pat. App. Pub. No.

2013/0192623 to Tucker et al., U.S. Pat. App. Pub. No. 2013/0298905 to Leven et al., U.S. Pat. App. Pub. No. 2013/0180553 to Kim et al., U.S. Pat. App. Pub. No. 2014/0000638 to Sebastian et al., U.S. Pat. App. Pub. No. 2014/0261495 to Novak et al., and U.S. Pat. App. Pub. No. 2014/0261408 to DePiano et al., all of which are incorporated herein by reference in their entireties.

Briefly returning to FIG. 1, in some examples, the flow sensor 110 may be implemented by a microelectromechanical systems-based (MEMS-based) sensor such as a MEMS microphone or MEMS pressure sensor within a housing of the aerosol delivery device 100, such as the housing of the control body 102 or cartridge 104, or a single housing comprising control components and cartridge components. The MEMS-based sensor may be configured to detect a pressure on the MEMS-based sensor caused by airflow through at least a portion of the housing, convert the pressure to an electrical signal, and output the electrical signal. The control component 108 (e.g., microprocessor) may be configured to receive the electrical signal from the MEMS-based sensor, and control operation of at least one functional element of the aerosol delivery device based thereon. Such control can be achieved through implementation of one or more control algorithms utilizing program code instructions. Examples of suitable control may include the microprocessor being configured to control the operation of a heater, fluid-delivery member, sensory-feedback member or any combination thereof.

In some examples, the MEMS-based sensor may function similar to an on/off switch. In these examples, the electrical signal output by the MEMS-based sensor may be a bilevel signal in which the absence of or a zero level electrical signal may indicate an "off" state, and a positive electrical signal indicates an "on" state.

In other examples, the MEMS-based sensor may be configured to convert the pressure to the electrical signal that varies with a corresponding variation in the pressure relative to an ambient pressure on the MEMS-based sensor. In these examples, the corresponding variation may be caused by variation in the airflow such as a variation in the rate of airflow.

FIG. 2 illustrates a MEMS-based sensor 200 that in some examples may correspond to a flow sensor such as the flow sensor 110 of FIG. 1. As shown, the MEMS-based sensor may include a (first) die 202 with a micromachined sensor 204. As also shown, the MEMS-based sensor may in some examples include another (second) die 206 wire bonded to the first die and including a bias generator circuit 208 configured to bias the micromachined sensor with an input voltage. In these examples, in an instance in which an input voltage is applied to the micromachined sensor, the pressure causes movement of the diaphragm and thereby a change in an electrical property of the micromachined sensor. The change in the electrical property causes a change in an output voltage across the micromachined sensor. This output voltage may be output by the MEMS-based sensor as the electrical signal. Or in some examples, the MEMS-based sensor (e.g. on the second die) may include an appropriate analog-to-digital converter (ADC) 209 or other circuitry configured to convert the output voltage to a digital representation, which the MEMS-based sensor may then output as the electrical signal.

In some examples, the MEMS-based sensor 200 may be a MEMS microphone. FIG. 3 schematically illustrates a micromachined sensor 304 for a MEMS microphone, which in some examples may correspond to the micromachined sensor 204 of FIG. 2. As shown, the micromachined sensor of the MEMS microphone may include a micromachined, pressure-sensitive diaphragm 306a and a backplate 306b that form a variable capacitor 306. In these examples, in an instance in which an input voltage is applied to the variable capacitor, the pressure causes movement of the diaphragm and thereby a change in a capacitance of the variable capacitor. The change in capacitance causes a change in the output voltage across the variable capacitor. The MEMS microphone may then output the output voltage or a digital representation of the output voltage as the electrical signal.

As will be appreciated, MEMS microphones are often utilized for audio applications in mobile telephones and hearing aids to capture audio for subsequent replication and output by speaker. These applications typically desire high fidelity of the audio output; and consequently, the MEMS microphone often includes a more complex bias generator circuit and additional circuitry such as various audio-grade filtering and amplification stages to more accurately capture and replicate audio. In the context of an aerosol delivery device, however, this additional circuitry may not be useful. In some examples, then, the MEMS microphone may include simplified versions of one or more of these components, or may not include them altogether. That is, the MEMS-based sensor 200 including the dies 202, 206 may be packaged in an integrated circuit package 210 with a more simplified bias generator circuit, less filtering and/or simpler, non-linear amplification, and may still be useful in many applications of an aerosol delivery device such as that described herein.

In some examples, the MEMS-based sensor 200 may be a MEMS pressure sensor. FIG. 4 schematically illustrates a micromachined sensor 404 for a MEMS pressure sensor, which in some examples may correspond to the micromachined sensor 204 of FIG. 2. As shown, the micromachined sensor of the MEMS pressure sensor may include a micromachined, pressure-sensitive diaphragm 406, and one or more piezoresistors 408 disposed on the diaphragm. In these examples, in an instance in which an input voltage is applied to the piezoresistor(s), the pressure causes movement of the diaphragm and thereby a change in a resistance of the piezoresistor(s). The change in resistance causes a change in the output voltage across the piezoresistor(s). The MEMS pressure sensor may then output the output voltage or a digital representation of the output voltage as the electrical signal.

Returning again to FIG. 1, the electrical signal output from the flow sensor 108, and more particularly in some examples the MEMS-based sensor (e.g., MEMS microphone, MEMS pressure sensor), can be used by one or more control elements of the aerosol delivery device to control the operation of the device. Such operation can encompass a variety of functional elements of the device, such as the heater 122, a fluid-delivery member, a sensory-feedback member and the like.

For example, the electrical signal from the flex/bend sensor can be used by a microprocessor to control opening and closing of a valve between the reservoir 118 and heater 122. For example, as the draw on the device 100 increases and the electrical signal output by the sensor correspondingly changes, the opening of the valve can be increased to allow for a greater volume of aerosol precursor composition to pass from the reservoir to heater. In some examples in which a sensory feedback member is used (e.g., a LED or a vibratory element), an increased draw on the device can signal the microprocessor to cause a different lighting pattern by the LED or cause a different vibration pattern by the vibratory element.

In some examples, the electrical signal output from the flow sensor 108 can be coupled with control electronics of the device 100 to alter the profile of a heating element in the device, such as the heater 122. In particular, the heating profile can be caused to change in real time relative to the airflow rate caused by the magnitude of the draw on the device.

FIG. 5 illustrates various operations in a method 500 of controlling operation of an aerosol delivery device including a MEMS-based sensor (e.g., MEMS microphone, MEMS pressure sensor). As shown at block 502, the method may include detecting a pressure on the MEMS-based sensor caused by airflow through at least a portion of the housing, with the MEMS-based sensor converting the pressure to an electrical signal. In some examples, the MEMS-based sensor converting the pressure includes converting the pressure to the electrical signal that varies with a corresponding variation in the pressure relative to an ambient pressure on the MEMS-based sensor, the corresponding variation being caused by variation in the airflow such as a variation in the rate of the airflow.

As explained above with respect to FIG. 3, in some examples the MEMS-based sensor may be a MEMS microphone including a micromachined sensor 304 having a micromachined, pressure-sensitive diaphragm 306a and a backplate 306b that form a variable capacitor 306. In these examples, in an instance in which an input voltage is applied to the variable capacitor, the pressure causes movement of the diaphragm and thereby a change in a capacitance of the variable capacitor. The change in capacitance causes a change in an output voltage across the variable capacitor. And the MEMS microphone outputs the output voltage or a digital representation thereof as the electrical signal.

As explained above with respect to FIG. 4, in some examples the MEMS-based sensor may be a MEMS pressure sensor including a micromachined sensor 404 having a micromachined, pressure-sensitive diaphragm 406, and one or more piezoresistors 408 disposed on the diaphragm. In these examples, in an instance in which an input voltage is applied to the piezoresistor(s), the pressure causes movement of the diaphragm and thereby a change in a resistance of the piezoresistor(s). The change in resistance causes a change in an output voltage across the piezoresistor(s). And the MEMS pressure sensor outputs the output voltage or a digital representation thereof as the electrical signal.

Regardless of the particular construction of the MEMS-based sensor, the method may include controlling operation of at least one functional element of the aerosol delivery device based on the electrical signal from the MEMS-based sensor, as shown at block 504. This may include, for example, controlling the operation of a heater, fluid-delivery member, sensory-feedback member or any combination thereof.

As a more particular example use of a variable electrical signal from the MEMS-based sensor, airflow rate through an aerosol delivery device can be detected with the MEMS-based sensor upon draw on the device by a user, and such airflow rate can be continuously detected for the duration of the draw. The MEMS-based sensor can output a signal that can vary based upon the airflow rate. The variable signal output from the MEMS-based sensor can be input by the microprocessor into a control algorithm to make the defined calculations based thereon and determine the requisite parameters for one or more properties of electrical current supplied to the heater relative to the output signal from the MEMS-based sensor. The microprocessor then directs electrical current flow to the heater with the requisite parameters to define heater function based upon the real time airflow rate through the device. In this manner, heater function can be continuously controlled and altered as necessary relative to the airflow rate through the device.

The foregoing description of use of the article can be applied to the various example implementations described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article illustrated in FIG. 1 or as otherwise described above may be included in an aerosol delivery device according to the present disclosure.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for controlling operation of an aerosol delivery device including a microelectromechanical systems-based (MEMS-based) sensor within a housing thereof, the method comprising:
   detecting a pressure on the MEMS-based sensor caused by airflow through at least a portion of the housing, the MEMS-based sensor being a MEMS microphone configured to convert the detected pressure to an electrical signal, and to output the electrical signal, the MEMS microphone including a die with a micromachined, pressure-sensitive diaphragm and a backplate that form a variable capacitor, the die being packaged in an integrated circuit package excluding additional circuitry designed and operable to process audio, wherein in an instance in which an input voltage is applied to the variable capacitor, the pressure causes movement of the diaphragm and thereby a change in a capacitance of the variable capacitor, the change in the capacitance causing a change in an output voltage across the variable capacitor, the output voltage or a digital representation thereof being output by the MEMS-based sensor as the electrical signal;
   receiving, at a microprocessor, the electrical signal from the MEMS-based sensor; and
   controlling, by the microprocessor, operation of at least one functional element of the aerosol delivery device based on the electrical signal.

2. The method of claim 1, wherein the MEMS-based sensor converting the pressure includes converting the pressure to the electrical signal that varies with a corresponding variation in the pressure relative to an ambient pressure on the MEMS-based sensor, the corresponding variation being caused by variation in the airflow.

3. The method delivery device of claim 2, wherein the corresponding variation in the pressure is caused by variation in a rate of the airflow.

4. The method of claim 1, wherein controlling the operation of at least one functional element includes controlling the operation of a heater, fluid-delivery member, sensory-feedback member or any combination thereof.

5. The method of claim 1, wherein the MEMS microphone further comprises another die, including a bias generator circuit, that is wire bonded to the die and packaged in the integrated circuit package, and wherein detecting the pressure on the MEMS-based sensor in the instance in which the input voltage is applied to the variable capacitor comprises biasing, by the bias generator circuit, the variable capacitor with the input voltage.

6. The method of claim 1, wherein the die is packaged in the integrated circuit package excluding the additional circuitry designed and operable to capture and replicate audio.

7. The method of claim 1, wherein the die is packaged in the integrated circuit package excluding the additional circuitry including a filtering stage.

8. The method of claim 1, wherein the die is packaged in the integrated circuit package excluding the additional circuitry including an amplification stage.

9. The method of claim 3, wherein controlling the operation of at least one functional element includes controlling the operation of a heater, including directing, by the microprocessor, current flow to the heater that varies with the variation in the rate of the airflow.

\* \* \* \* \*